United States Patent [19]
Sugimori et al.

[11] Patent Number: 5,986,908
[45] Date of Patent: Nov. 16, 1999

[54] MAGNETIC-COUPLING MULTIVIBRATOR

[75] Inventors: Katsunori Sugimori, Tokyo; Hiroshi Sakamoto, Kumamoto-ken; Koosuke Harada, Fukuoka-ken, all of Japan

[73] Assignee: Nippon Electric Industry Co., Ltd., Tokyo, Japan

[21] Appl. No.: 09/067,424

[22] Filed: Apr. 28, 1998

[30] Foreign Application Priority Data

Mar. 12, 1998 [JP] Japan ................................. 10-80318

[51] Int. Cl.⁶ .................................................. H02M 3/18
[52] U.S. Cl. .............................................. 363/61; 363/59
[58] Field of Search .................................. 363/99, 90, 91, 363/61, 59; 323/361

[56] References Cited

U.S. PATENT DOCUMENTS

| | | | |
|---|---|---|---|
| 3,619,713 | 11/1971 | Biega et al. | 315/105 |
| 4,051,445 | 9/1977 | Boschert | 363/56 |
| 5,841,241 | 11/1998 | Nilssen | 315/224 |

OTHER PUBLICATIONS

"A Variable Frequency Magnetic–Coupled Multivibrator", by R.L. Van Allen, AIEE Trans. (Commun. and Elect.), 74, Pt1, 1955, pp. 356–361.

*Primary Examiner*—Peter S. Wong
*Assistant Examiner*—Rajnikant B. Patel
*Attorney, Agent, or Firm*—Jordan and Hamburg LLP

[57] ABSTRACT

A magnetic-coupling multivibrator has a rectification circuit including first and second smoothing capacitors connected at a capacitor common junction, the first smoothing capacitor providing a high potential output, the second smoothing capacitor providing a low potential output. A switching series circuit has first and second switching elements connected in series at a common switching junction, the switching series circuit being connected in parallel to the smoothing capacitors. A first saturable transformer has a first saturation coil, a first control coil and a first gate drive coil, and a second saturable transformer has a second saturation coil, a second control coil and a second gate drive coil. A first gate control circuit interfaces the first gate drive coil with the first switching element to effect turn on and off and a second gate control circuit for interfacing the second gate drive coil with the second switching element to effect turn on and off alternately with turn on and turn off of the first switching element to effect continuous oscillation. A current source for driving the first and second control coils to control saturation of the first saturable transformer and the second saturable transformer to effect control of a frequency of the continuous oscillation.

17 Claims, 3 Drawing Sheets

MAGNETIC-COUPLING MULTIVIBRATOR

BACKGROUND OF THE INVENTION

The present invention relates to a variable-frequency magnetic coupling oscillator suitable for controlling an output voltage and current of a converter used in a battery charger for electric vehicles as well as of other general-use converters.

For charging secondary cells used as a power supply in an electric vehicle, a non-contact type battery charger has been proposed which makes use of an electromagnetic induction by a high-frequency transformer. The core of a battery charger is a so-called one converter in which a PFC (power factor correction) converter and a DC/DC converter are formed integrally. For controlling a plurality of switching elements, used in the converter, to turn on and off, it has been necessary to control the frequency of the high-frequency transformer for control of the battery charger output voltage since the output voltage varies greatly due to load current when the frequency is constant.

For this reason, the circuit controlling the plurality of switching elements incorporated in the one-converter circuit should be provided with a function of variable-frequency control. A flip-flop is driven with an output pulse of a V/F converter for variable-frequency control of the plurality of switching elements in the battery charger converter, as shown in FIG. 3.

As seen in FIG. 3, two switching elements 103 and 104 are connected in parallel across a primary coil 108 of a pulse transformer 107, and two secondary coils 109 and 110 of different polarities are provided at the secondary side of the pulse transformer 107. When driven, a V/F converter 101 delivers an output pulse to a flip-flop 102. The flip-flop 102 will deliver a set output signal and a reset output signal to the switching elements 103 and 104. These switching elements 103 and 104 are driven with these output signals from the flip-flop 102 to turn on and off alternately. Signals to turn on and off, alternately, the plurality of switching elements incorporated in the one-converter circuit of a battery charger are delivered from secondary coils 109 and 110 of the pulse transformer 107. However, the method for variable-frequency control using the above-mentioned V/F converter and flip-flop is disadvantageous in the complicated circuit configuration, large power consumption and high sensitivity to noise.

Also, a circuit using two transistors and two saturable inductors has been used in practice, but its oscillation frequency is too low to provide a frequency of several hundreds kHz.

SUMMARY OF THE PRESENT INVENTION

Accordingly, the present invention has an object to overcome the above-mentioned drawbacks of the prior art by providing a magnetic coupling multivibrator comprising two sets of saturable transformers each having a saturation coil, control coil and a gate drive coil, two switching elements controlled by the gate drive coil to turn on and off alternately, and high-frequency transformers adapted to receive a high-frequency power generated by driving the two switching elements and provide a plurality of high-frequency powers of different polarities in a frequency range of several hundreds kHz.

According to the present invention, a plurality of switching elements incorporated in the one-converter circuit used in a one-converter battery charger for electric vehicles are driven directly by the secondary coils of the high-frequency transformers in the magnetic coupling multivibrator, so that the one-converter circuit configuration is simplified.

BRIEF DESCRIPTION OF THE DRAWINGS

These objects and other objects, features, aspects and advantages of the present invention will become more apparent from the following detailed description of the present invention when taken in conjunction with the accompanying drawings, of which.

DETAILED DESCRIPTION

Figure 1:
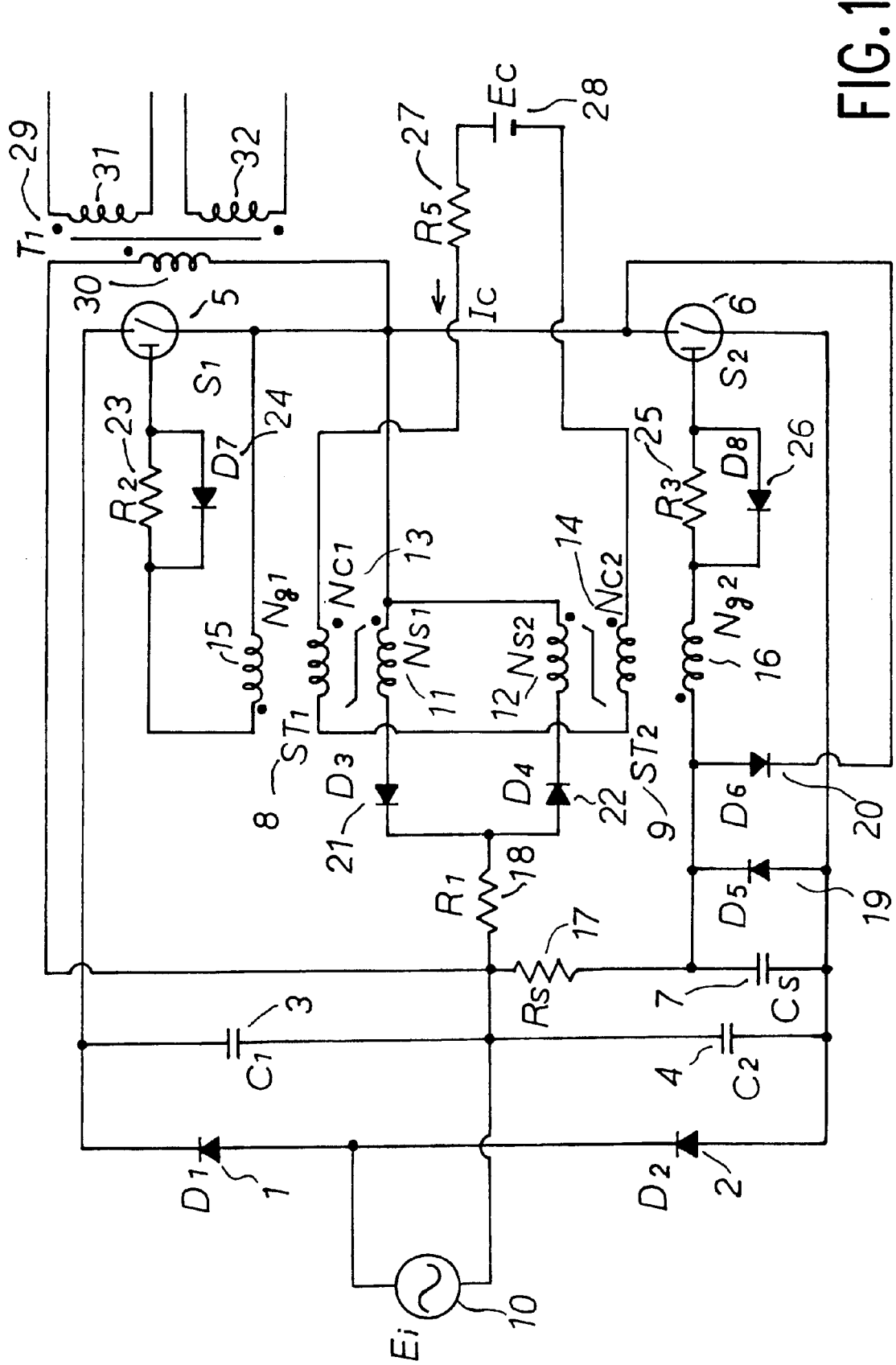
FIG. 1 is a block diagram showing a circuit configuration of a magnetic coupling multivibrator according to the present invention.

Referring now to FIG. 1, both ends of two diodes 1 and 22 connected in series to each other, are connected in parallel to both ends of two smoothing capacitors 3 and 4 connected in series to each other, and common junction points between the diodes 1 and 2 and the capacitors 3 and 4 are connected across an AC source 10, to thereby form a full-wave voltage doubler rectification circuit.

There are provided a first saturable transformer 8 having a saturation coil 11, control coil 13 and a gate drive coil 15, and a second saturable transformer 9 similarly having a saturation coil 12, control coil 14 and a gate drive coil 16. The gate drive coil 15, of the first saturable transformer 8, is connected between a gate and source of a switching element (MOS-FET) 5 via a parallel circuit formed from a resistor 23 and diode 24. One end of the gate drive coil 16 of the second saturable transformer 9 is connected to a gate of a switching element (MOS-FET) 6 via a parallel circuit formed from a resistor 25 and diode 26 while the other end is connected to a drain of the switching element 6 via a diode 20 and to a source of the switching element 6 via a diode 19.

One end of the control coil 13, of the first saturable transformer 8, is connected in series to one end of the control coil 14 of the second saturable transformer 9, and a resistor 27 and a DC source 28 are connected in series between other ends of the control coils 13 and 14, respectively.

One end of the saturation coil 11 of the first saturable transformer 8 and one end of the saturation coil 12 of the second saturable transformer 9 are connected to a common junction point between the switching elements 5 and 6, while other ends of the first and second saturable transformers 8 and 9, respectively, are connected to one end of a resistor 18 via diodes 21 and 22 to effect a parallel connection.

A second end of the resistor 18 is connected to a common junction point between the smoothing capacitors 3 and 4, and a series circuit, formed from a resistor 17 and capacitor 7 is connected in parallel across the capacitor 4.

Ends of a series circuit formed from the switching elements 5 and 6, connected in series to each other, are connected to a series circuit formed from the two smoothing capacitors 3 and 4.

A primary coil 30 of a high-frequency output transformer 29 is connected across a common junction points between the two switching elements 5 and 6 and between the two smoothing capacitors 3 and 4.

Further, there are provided two secondary coils 31 and 32, of different polarities, at the secondary side of the high-frequency output transformer 29 to provide high-frequency signals which will turn on and off, alternately, a gate drive circuit for switching elements in the converter used in a battery charger for an electric vehicle. Note that the secondary coils 31 and 32 of the high-frequency output transformer 29 are provided in a number corresponding to the number of the switching elements used in the converter and which are to be controlled with the high-frequency signals.

Power supplied from the AC source 10 is subjected to a voltage doubler rectification in the diodes 1 and 2 to provide a DC voltage of about √2·Ei=V to each of the smoothing capacitors 3 and 4. As the potential in the capacitor 4 increases, the capacitor 7 is charged through the resistor 17 until the switching element 6 is turned on. The potential in the capacitor 7 is discharged via the diode 20 and switching element 6. The diode 19 is provided to prevent application to the capacitor 7 of a high backward voltage taking place due to a gate input capacity increased under the Miller effect and a leakage inductance of the gate drive coil.

Each coil of the first and second saturable transformers 8 and 9 is applied with a backward voltage and thus driven so that the switching element 6 will turn on while the switching element 5 will turn off.

When a saturation magnetic flux is reached at a time T/2, a pulsed saturation current flows through the resistor 18 so that the drive voltage falls. Therefore, the switching element 6 will turn off, the voltage on each coil be inverted, and the switching element 5 will be turned on, which will be followed by a continuous oscillation.

Assume that the effective sectional area of an amorphous core of each of the first and second saturable transformers 8 and 9 is S, mean magnetic path length is 1, relative magnetic permeability is $\mu_s$, number of turns of the saturation coil is $N_s$, that of the control coil is $N_c$ and that of the gate drive coil is $N_g$, and a voltage of a nearly square waveform having a peak value V and period T is applied to the saturation coil. Then, these parameters can be expressed as follows:

$$e = -N_s \frac{d\phi}{dt}, \; d\phi = -\frac{1}{N_s} e\,dt, \; \phi = -\frac{1}{N_s} \int e\,dt \quad (1)$$

$$\phi\left(\frac{T}{2}\right) = -\frac{1}{N_s} \int_0^{T/2} e\,dt = \frac{VT}{2N_s} + \phi_0 2\phi_s,$$

$$\phi_0 = \mu_0 \mu_s SI_c \frac{N_c}{1}, \; T = \frac{1}{f} = \frac{2N_s(2\phi_s - \phi_0)}{V}$$

Therefore, $$f = \frac{V}{2N_s\left(2\phi_s - \frac{\mu_0\mu_s SI_c N_c}{1}\right)} \quad (2)$$

Figure 2:
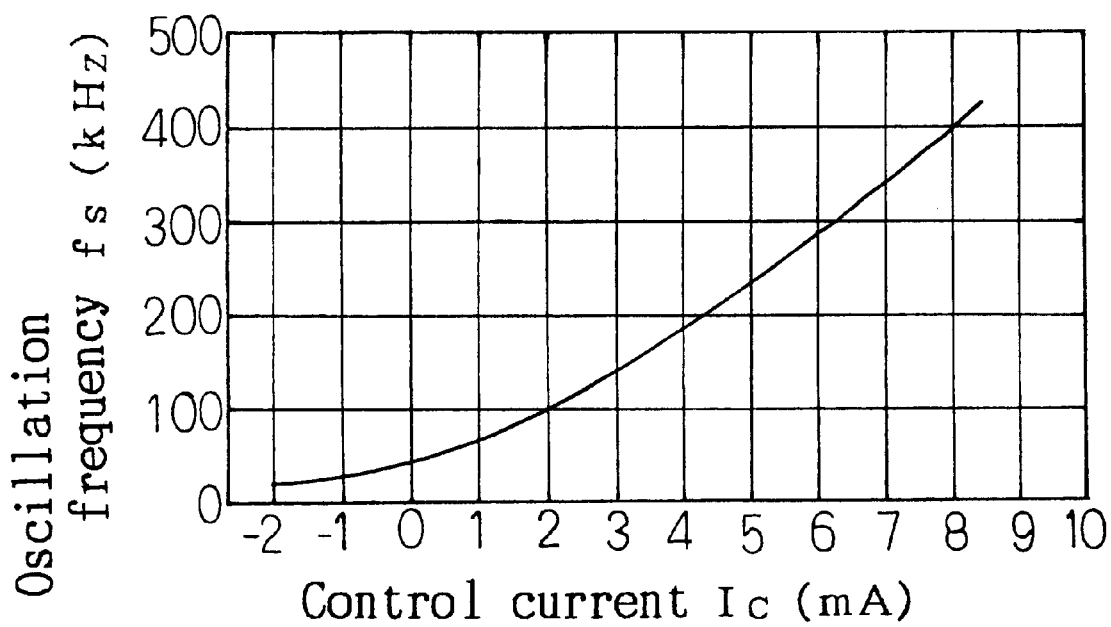
FIG. 2 is a characteristic curve of the magnetic coupling multivibrator FIG. 1.
Figure 3:
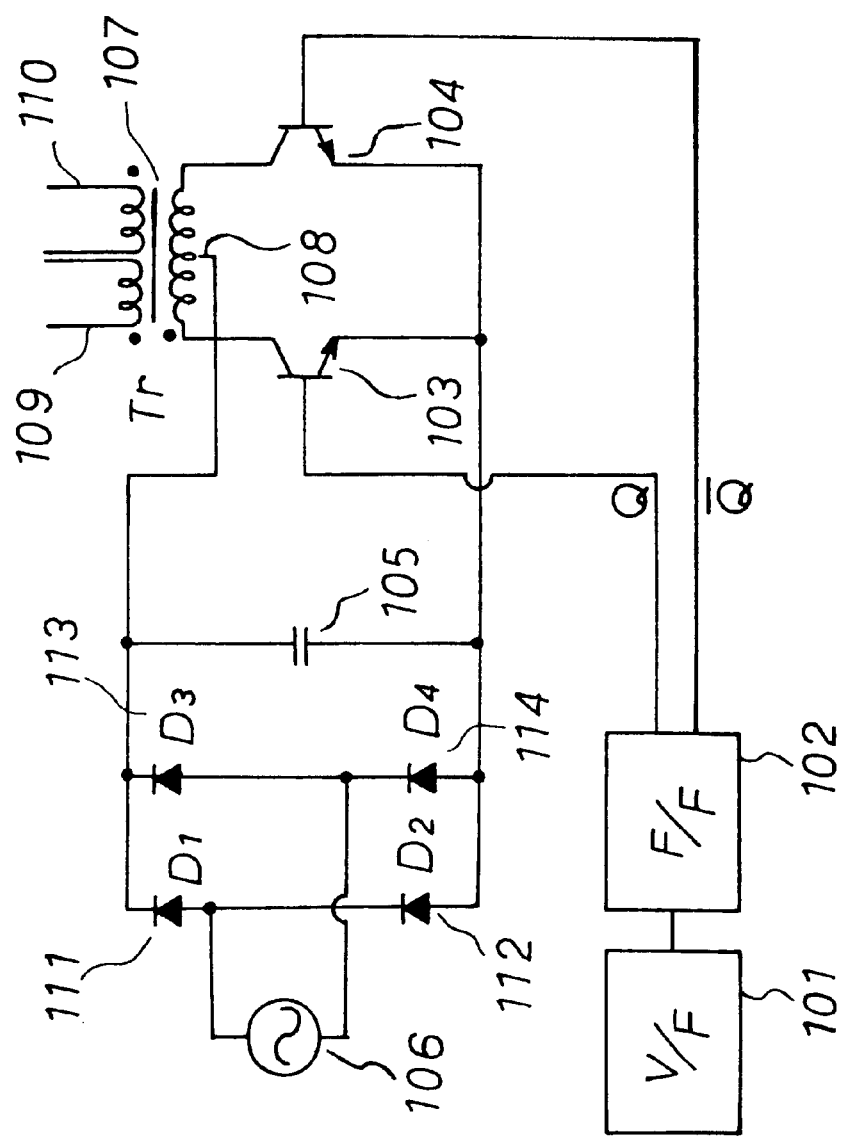
FIG. 3 is a block diagram of a prior-art variable-frequency oscillator using a V/F converter.

When experimental data are used for the parameters in the expression (2) above to determine the oscillation characteristic of the magnetic-coupling multivibrator according to the present invention, a characteristic curve showing a relation between the control current and oscillation frequency as shown in FIG. 2 is provided to reveal that the oscillation frequency will increase generally linearly in relation to the control current.

The oscillation frequency of the magnetic-coupling multivibrator according to the present invention has a wide range from several kHz to several hundred kHz, the high-frequency oscillation is stable, the upper and lower arms of each of the switching elements used in the battery charger converter will never turn on simultaneously even when the oscillation stops, and the magnetic-coupling multivibrator is not sensitive to noise.

Also, the magnetic-coupling multivibrator according to the present invention can be used with a commercial AC power ±10% as it is and will not consume such power.

What is claimed is:

1. A magnetic-coupling multivibrator, comprising:
   a full-wave voltage doubler rectification circuit including a series diode circuit formed from first and second rectifying diodes connected at a diode common junction, a series capacitor circuit formed from first and second smoothing capacitors connected at a capacitor common junction, the series diode circuit and the series capacitor circuit being connected in parallel to each other with a cathode of the first rectifying diode connected to said first smoothing capacitor and an anode of the second rectifying diode connected to said second smoothing capacitor, and an AC source connected across the diode common junction and the capacitor common junction;
   a switching series circuit having first and second switching elements connected in series at a common switching junction, the switching series circuit being connected in parallel to the series capacitor circuit;
   a first saturable transformer having a first saturation coil, a first control coil and a first gate drive coil;
   a second saturable transformer having a second saturation coil, a second control coil and a second gate drive coil;
   the first and second gate control coils respectively controlling the first and second switching elements to turn on and off alternately to continuously oscillate;
   a series charging circuit formed from a resistor and a charging capacitor connected in parallel across the second smoothing capacitor such that the charging capacitor is charged in accordance with charging of the second smoothing capacitor;
   a protection diode having a cathode connected to a positive side of the charging capacitor and an anode connected to a negative side of the charging capacitor;
   a discharge diode having an anode connected to the positive side of the charging capacitor and a cathode connected to the common switching junction; and
   a high-frequency output transformer having a primary coil connected across the capacitor common junction and the common switching junction to receive high-frequency power generated by the first and second saturable transformers and the first and second switching elements.

2. The magnetic-coupling multivibrator as set forth in claim 1, wherein:
   the first gate drive coil is connected across a gate and source of the first switching element via a parallel circuit formed of a resistor and diode so as to control the first switching element;
   the second gate drive coil is connected to a gate of the second switching element via a parallel circuit formed of a resistor and diode and to a drain of the second switching element via a diode so as to control the second switching element;
   the first and second control coils are connected at first ends thereof in series to each other and are connected at second ends to a series circuit formed from a resistor and a DC source;
   The first saturation coil has a first terminal connected to the common switching junction and the second saturation coil has a first terminal connected to the common switching junction;

the first saturation coil has a second terminal connected to a first coil drive diode for conducting current from said first saturation coil and the second saturation coil has a second terminal connected to a second coil drive diode for conducting current to said first saturation coil; and a supply resistor connects the first and second coil drive diodes to the capacitor common junction of the full-wave voltage doubler rectification circuit.

3. A magnetic-coupling multivibrator, comprising:

a rectification circuit including a series capacitor circuit formed from first and second smoothing capacitors connected at a capacitor common junction, the first smoothing capacitor providing a high potential output, the second smoothing capacitor providing a low potential output, a diode circuit supplying the first and second smoothing capacitors, and means for connecting an AC source across the diode circuit and the capacitor common junction;

a switching series circuit having first and second switching elements connected in series at a common switching junction, the switching series circuit being connected in parallel to the series capacitor circuit with said first switching element being connected to the high potential output and the second switching element being connected to the low potential output;

a first saturable transformer having a first saturation coil and a first gate drive coil;

a second saturable transformer having a second saturation coil and a second gate drive coil;

the first saturation coil and the second saturation coil having first terminals connected to the common switching junction;

a current directing and voltage dropping circuit connecting second terminals of the first saturation coil and the second saturation coil to the capacitor common junction such that the first saturation coil delivers current to the capacitor common junction and the second saturation coil draws current from the capacitor common junction;

a first gate control circuit for interfacing the first gate drive coil with the first switching element to effect turn on and turn off;

a second gate control circuit for interfacing the second gate drive coil with the second switching element to effect turn on and turn off alternately with turn on and turn off of the first switching element to produce continuous oscillation;

an initiating circuit for initiating oscillation by turning on one of the first switching element and the second switching element; and a high-frequency output transformer having a primary coil connected across the capacitor common junction and the common switching junction to receive high-frequency power generated by driving the first and second saturable transformers with the first and second switching elements.

4. The magnetic-coupling multivibrator according to claim 3, wherein the initiating circuit includes:

a series charging circuit formed from a resistor and a charging capacitor connected in parallel across the second smoothing capacitor such that the charging capacitor is charged in accordance with charging of the second smoothing capacitor; and a discharge diode having an anode connected to the positive side of the charging capacitor and a cathode connected to the common switching junction.

5. The magnetic-coupling multivibrator according to claim 4, wherein the initiating circuit further includes a protection diode having a cathode connected to a positive side of the charging capacitor and an anode connected to a negative side of the charging capacitor.

6. The magnetic-coupling multivibrator as set forth in claim 5, wherein the current directing and voltage dropping circuit includes:

a first coil drive diode and a second coil drive diode;

the first saturation coil having the second terminal thereof connected to the first coil drive diode for conducting current from said first saturation coil and the second saturation coil having the second terminal thereof connected to the second coil drive diode for conducting current to said first saturation coil; and a supply resistor connecting the first and second coil drive diodes to the capacitor common junction of the rectification circuit.

7. The magnetic-coupling multivibrator as set forth in claim 3, wherein the current directing and voltage dropping circuit includes:

a first coil drive diode and a second coil drive diode;

the first saturation coil having the second terminal thereof connected to the first coil drive diode for conducting current from said first saturation coil and the second saturation coil having the second terminal thereof connected to the second coil drive diode for conducting current to said first saturation coil; and a supply resistor connecting the first and second coil drive diodes to the capacitor common junction of the rectification circuit.

8. The magnetic-coupling multivibrator according to claim 3, wherein:

the first gate control circuit includes a parallel circuit formed of a resistor and diode, and the first gate drive coil being connected across a gate and source of the first switching element via the parallel circuit formed of the resistor and the diode so as to control the first switching element; and the second gate control circuit includes a parallel circuit formed of a resistor and diode, and the second gate drive coil being connected to a gate of the second switching element via the parallel circuit formed of the resistor and the diode and to a drain of the second switching element via a diode so as to control the second switching element.

9. The magnetic-coupling multivibrator according to claim 3, further comprising:

the first saturable transformer having a first control coil;

the second saturable transformer having a second control coil; and a current source for driving the first and second control coils to control saturation of the first saturable transformer and the second saturable transformer to effect control of a frequency of said continuous oscillation.

10. The magnetic-coupling multivibrator according to claim 3, wherein the current source includes:

a control resistor;

a DC source in series with the control resistor; and the first and second control coils being connected at first ends thereof in series to each other and being connected at second ends to a series circuit formed from the control resistor and the DC source.

11. A magnetic-coupling multivibrator, comprising:

a rectification circuit including a series capacitor circuit formed from first and second smoothing capacitors connected at a capacitor common junction, the first smoothing capacitor providing a high potential output, the second smoothing capacitor providing a low potential output, a diode circuit supplying the first and second smoothing capacitors, and means for connecting an AC source across the diode circuit and the capacitor common junction;

a switching series circuit having first and second switching elements connected in series at a common switching junction, the switching series circuit being connected in parallel to the series capacitor circuit with said first switching element being connected to the high potential output and the second switching element being connected to the low potential output;

a first saturable transformer having a first saturation coil, a first control coil and a first gate drive coil;

a second saturable transformer having a second saturation coil, a second control coil and a second gate drive coil;

the first saturation coil and the second saturation coil having first terminals connected to the common switching junction;

a current directing and voltage dropping circuit connecting second terminals of the first saturation coil and the second saturation coil to the capacitor common junction such that the first saturation coil delivers current to the capacitor common junction and the second saturation coil draws current from the capacitor common junction;

a first gate control circuit for interfacing the first gate drive coil with the first switching element to effect turn on and off;

a second gate control circuit for interfacing the second gate drive coil with the second switching element to effect turn on and off alternately with turn on and turn off of the first switching element to effect continuous oscillation;

a current source for driving the first and second control coils to control saturation of the first saturable transformer and the second saturable transformer to effect control of a frequency of said continuous oscillation;

an initiating circuit for initiating oscillation by turning on one of the first switching element and the second switching element; and a high-frequency output transformer having a primary coil connected across the capacitor common junction and the common switching junction to receive high-frequency power generated by driving the first and second saturable transformers with the first and second switching elements.

12. The magnetic-coupling multivibrator according to claim 11, wherein the current source includes:

a control resistor;

a DC source in series with the control resistor; and the first and second control coils being connected at first ends thereof in series to each other and being connected at second ends to a series circuit formed from the control resistor and the DC source.

13. The magnetic-coupling multivibrator according to claim 11, wherein the initiating circuit includes:

a series charging circuit formed from a resistor and a charging capacitor connected in parallel across the second smoothing capacitor such that the charging capacitor is charged in accordance with charging of the second smoothing capacitor; and a discharge diode having an anode connected to the positive side of the charging capacitor and a cathode connected to the common switching junction.

14. The magnetic-coupling multivibrator according to claim 13, wherein the initiating circuit further includes a protection diode having a cathode connected to a positive side of the charging capacitor and an anode connected to a negative side of the charging capacitor.

15. The magnetic-coupling multivibrator as set forth in claim 11, wherein the current directing and voltage dropping circuit includes:

a first coil drive diode and a second coil drive diode;

the first saturation coil having the second terminal thereof connected to the first coil drive diode for conducting current from said first saturation coil and the second saturation coil having the second terminal thereof connected to the second coil drive diode for conducting current to said first saturation coil; and a supply resistor connecting the first and second coil drive diodes to the capacitor common junction of the rectification circuit.

16. The magnetic-coupling multivibrator according to claim 15, wherein:

the first gate control circuit includes a parallel circuit formed of a resistor and diode, and the first gate drive coil being connected across a gate and source of the first switching element via the parallel circuit formed of the resistor and the diode so as to control the first switching element; and the second gate control circuit includes a parallel circuit formed of a resistor and diode, and the second gate drive coil being connected to a gate of the second switching element via the parallel circuit formed of the resistor and the diode and to a drain of the second switching element via a diode so as to control the second switching element.

17. The magnetic-coupling mulltivibrator according to claim 11, wherein:

the first gate control circuit includes a parallel circuit formed of a resistor and diode, and the first gate drive coil being connected across a gate and source of the first switching element via the parallel circuit formed of the resistor and the diode so as to control the first switching element; and the second gate control circuit includes a parallel circuit formed of a resistor and diode, and the second gate drive coil being connected to a gate of the second switching element via the parallel circuit formed of the resistor and the diode and to a drain of the second switching element via a diode so as to control the second switching element.

* * * * *